US006588110B2

(12) United States Patent
Galster et al.

(10) Patent No.: US 6,588,110 B2
(45) Date of Patent: Jul. 8, 2003

(54) GUIDE BAR HAVING ROTATING GUIDE DISC

(75) Inventors: Werner Galster, Aspach (DE); Viktor Galster, Weissach im Tal (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 10/162,899

(22) Filed: Jun. 6, 2002

(65) Prior Publication Data

US 2002/0166243 A1 Nov. 14, 2002

Related U.S. Application Data

(63) Continuation of application No. PCT/EP00/12645, filed on Dec. 13, 2000.

(30) Foreign Application Priority Data

Dec. 15, 1999 (DE) ........................................ 199 60 460

(51) Int. Cl.[7] .......................... B27B 17/00; B62J 13/00; F16H 55/12

(52) U.S. Cl. .......................... 30/382; 30/384; 474/144; 474/151

(58) Field of Search .......................... 30/381–384, 385; 59/78.1, 78, 84; 474/140, 144, 158, 159, 151

(56) References Cited

U.S. PATENT DOCUMENTS 877,820 A * 1/1908 Badger ....................... 474/144
3,045,502 A * 7/1962 Carlton .................... 29/893.33
3,124,177 A * 3/1964 Ekrud ......................... 30/384
3,144,890 A * 8/1964 Irgens ......................... 30/383
3,156,130 A * 11/1964 Gant .......................... 474/151
3,163,052 A * 12/1964 Oehrli et al. ................. 30/383
3,198,222 A * 8/1965 Bowen, III .................. 30/384
3,198,223 A * 8/1965 Bowen, III .................. 30/384
3,291,169 A * 12/1966 Morner ........................ 30/383
3,410,147 A * 11/1968 Scott-Jackson .............. 30/383
3,872,901 A 3/1975 Bernard
3,995,370 A 12/1976 Allard et al.
4,240,303 A * 12/1980 Mosley ....................... 474/144
4,297,786 A * 11/1981 Tuggle ........................ 30/382
4,492,030 A * 1/1985 Beerens ....................... 30/384
4,593,591 A 6/1986 Beerens
4,813,135 A * 3/1989 Kuwica ....................... 30/384
6,178,960 B1 * 1/2001 Svensson ..................... 125/21

* cited by examiner

*Primary Examiner*—Allan N. Shoap
*Assistant Examiner*—Isaac Hamilton
(74) *Attorney, Agent, or Firm*—Walter Ottesen

(57) ABSTRACT

The invention relates to a guide bar for a motor-driven chain saw comprising an elongated planar base body which has a guide groove (8) in its outer periphery for guiding a saw chain (6). The saw chain (6) includes cutting links (14), lateral connecting links (12) and center drive links (10). The links are pivotally connected to each other with rivets (18). The drive links (10) engage with rakers (11) in the guide groove (8); whereas, the connecting links (12) are supported on guide surfaces (9) provided laterally of the guide groove (8). The guide bar (3) is fixed to the housing (2) of the motor-driven chain saw (1) at its attachment end (4) and the free tip (22) of the guide bar (3) has a direction-changing section (21) for the saw chain (6). In the region of the direction-changing section (21), guide plates (23, 43) are attached to the guide bar (3). The guide plates (23, 43) extend radially beyond the guide path of the guide surfaces (9) and laterally cover the connecting links (12, 14) of the saw chain (6). The guide plates are configured as guide discs (23, 43) which are rotatably moved in order to be able to conduct plunge cutting operations without increasing the danger of kickback.

12 Claims, 9 Drawing Sheets

GUIDE BAR HAVING ROTATING GUIDE DISC

RELATED APPLICATION

This application is a continuation of international patent application PCT/EP 00/12645, filed Dec. 13, 2000, and claiming priority from German patent application 199 60 460.6, filed Dec. 15, 1999.

BACKGROUND OF THE INVENTION

A guide bar is disclosed in U.S. Pat. No. 3,995,370 wherein guide plates are mounted in the region of the bar tip on each longitudinal side of the guide bar. The guide plates project laterally beyond the guide rails of the guide groove. The radial projection is so provided that the chain links are substantially covered laterally and only the cutting links project beyond the edge of the guide plates. In this way, it is ensured that the penetration depth of the cutting teeth into the wood to be cut is reduced during plunge cutting. The kickback tendency during plunge cutting is intended to thereby be reduced.

In practice, it has been shown that a projection of the fixed guide plates, which is too great, leads to a deterioration of the cutting power and plunge cutting work can be hindered. On the other hand, the projection of the guide plates is, however, to be selected so large that the kickback tendency of the motor-driven chain saw is reduced for plunge cutting work. These two requirements contradict each other and can only be solved by a compromise which is unsatisfactory.

SUMMARY OF THE INVENTION

It is an object of the invention to provide a guide bar of the kind described above, which is so improved that the kickback effect is reduced for plunge cutting work while, at the same time, providing a good cutting power.

The guide bar of the invention is for a saw chain of a motor-driven chain saw having a housing, the saw chain including cutting links, lateral connecting links and center drive links pivotally connected to each other via rivets with the drive links having respective rakers formed thereon. The guide bar includes: an elongated planar base body defining an outer periphery wherein a peripheral guide groove is provided for receiving the rakers therein and for guiding the saw chain along the outer periphery; the guide bar having guiding surfaces along the outer periphery for supporting the lateral connecting links and the cutting links and the guiding surfaces being separated from each other by the guide groove; the guide bar having an attachment end at one end thereof for attaching the guide bar to the housing of the chain saw and a direction-changing section at the other end thereof for guiding the saw chain over the outer free end of the guide bar; guide plates mounted on the base body in the direction-changing section and extending radially beyond the guiding surfaces to laterally cover the connecting links and the cutting links of the saw chain; and, the guide plates being configured as rotating guide discs.

It has been shown that a good cutting power is achieved when configuring the guide plates as rotating guide discs and the kickback effect is nonetheless significantly reduced. Depending upon boundary conditions, the kickback angle is significantly reduced compared to conventional guide bars.

Advantageously, the guide discs are driven by the moving saw chain whereby a taking along of the guide discs is provided in the running direction of the saw chain.

It is practical to connect the guide discs so that they rotate with the idler sprocket held in the tip of the guide bar. The saw chain entrains the idler sprocket form tight and the idler sprocket takes along the guide discs in the direction of rotation, for example, via the bearing of the idler sprocket. The direction-changing section is assembled for this purpose from side plates and a bearing for a guide disc is mounted in each side plate.

Preferably, the rotating guide discs have a radius which is so large that the disc edge ends at a slight spacing radially below the cutting roof. In order that there is no hindrance of the cutting action in the region of the cutting tooth, a cutting section of the cutting tooth projects beyond the disc edge or, in the region of the cutting tooth, a cutout is provided in the disc edge which exposes the cutting tooth.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
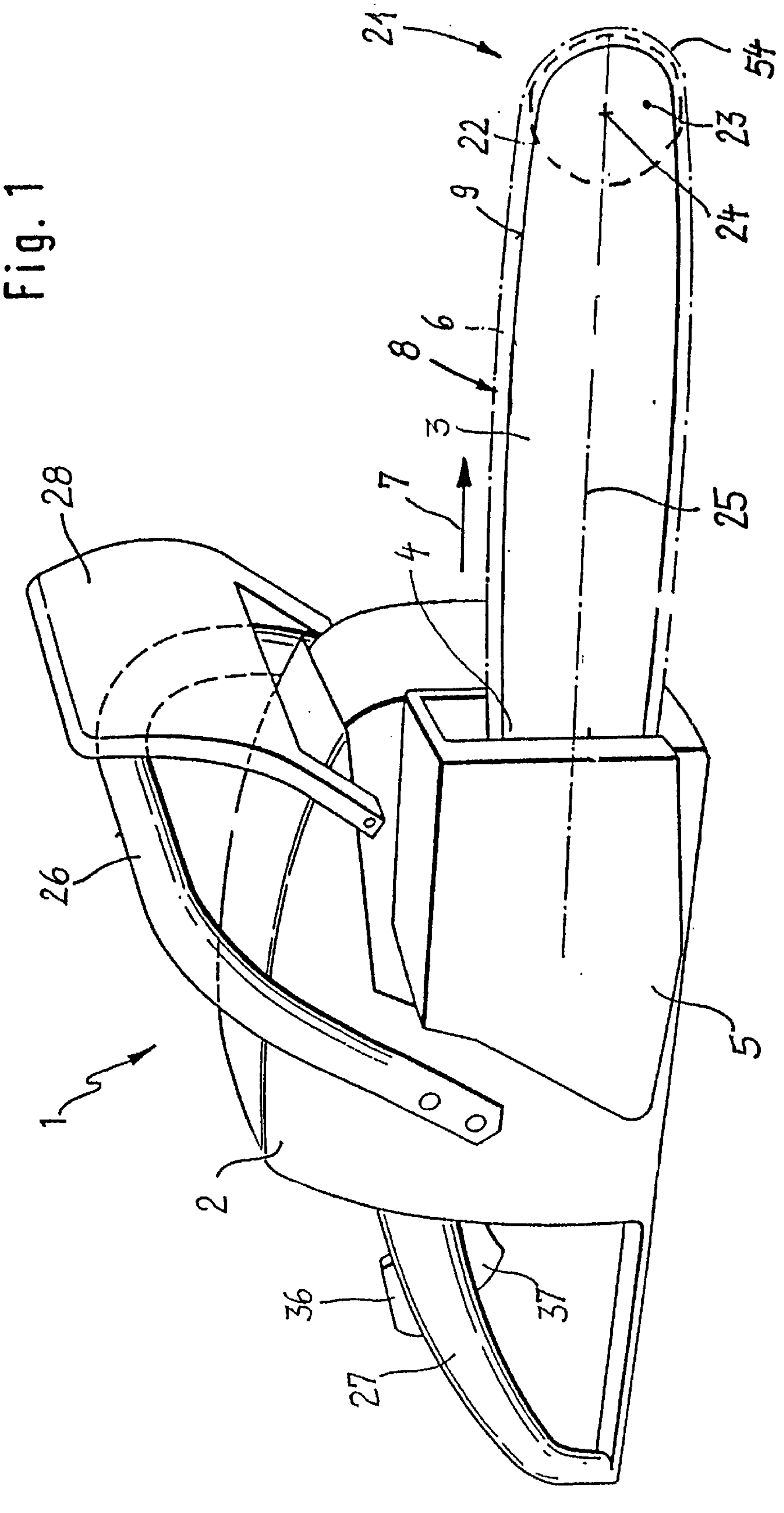
FIG. 1 is a schematic perspective view of a motor-driven chain saw.

FIG. 1 shows a motor-driven chain saw 1 wherein a guide bar 3 having an attachment end 4 is fixed to the housing 2 of the chain saw. The attachment end 4 is clamped between a sprocket wheel cover 5 and the housing 2 of the motor-driven chain saw 1. A drive motor for driving the saw chain 6 on the guide bar 3 in the direction of arrow 7 is mounted in the housing 2 of the chain saw 1. The internal combustion engine is usually a two-stroke engine. It can be practical to use a valve-controlled two-stroke engine, a four-stroke engine or a like engine.

Figure 2:
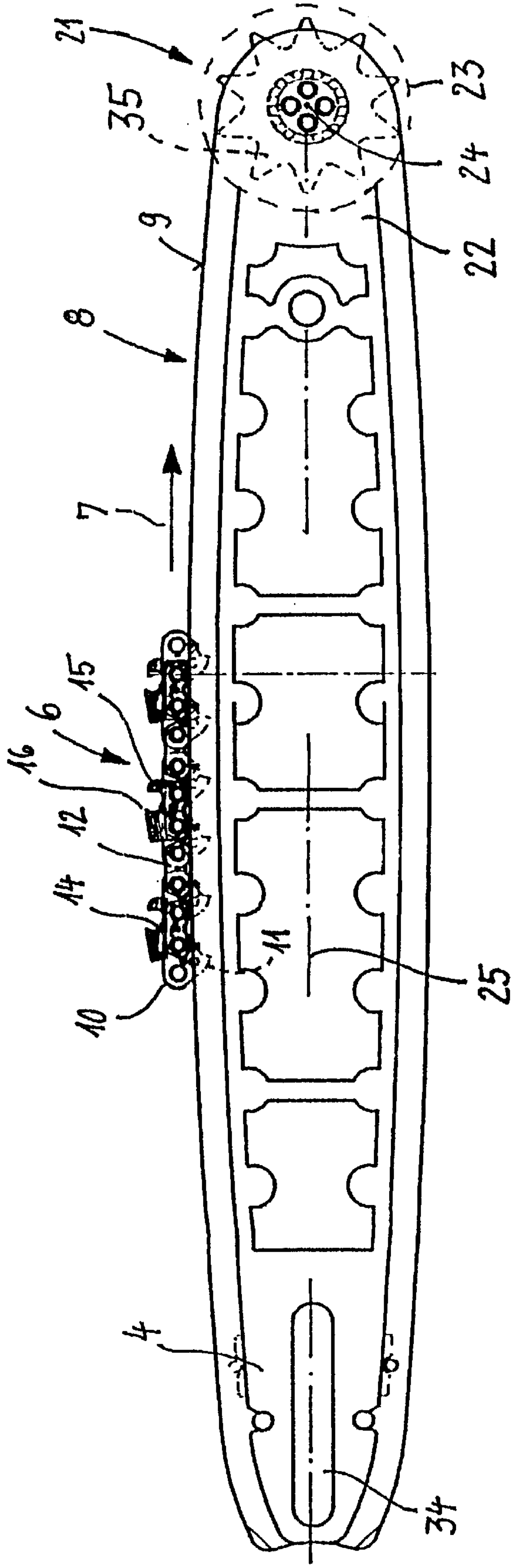
FIG. 2 is a side elevation view of a guide bar according to an embodiment of the invention.
Figure 3:
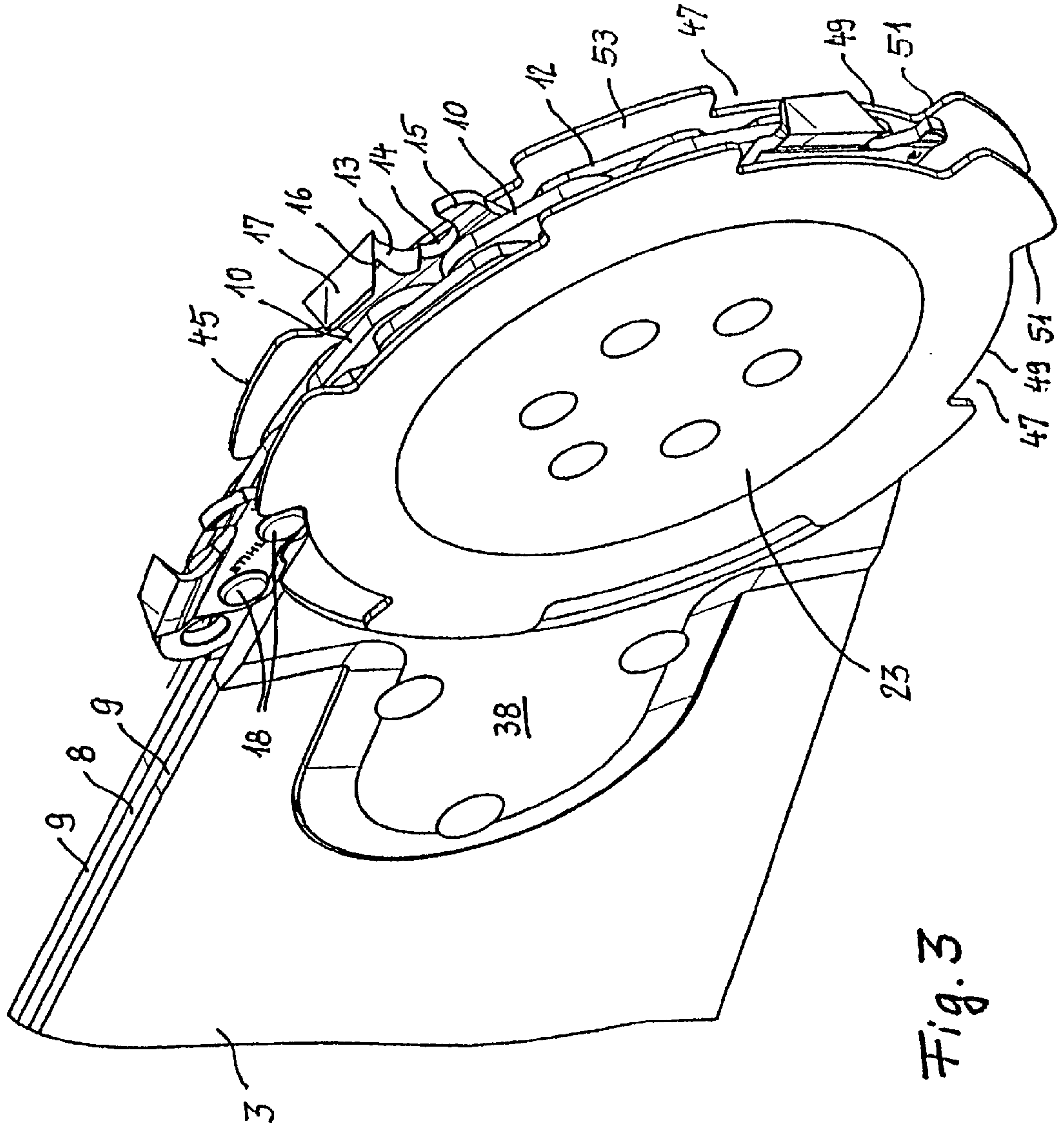
FIG. 3 is a perspective view of the tip of the guide bar in accordance with a further embodiment of the invention.
Figure 4:
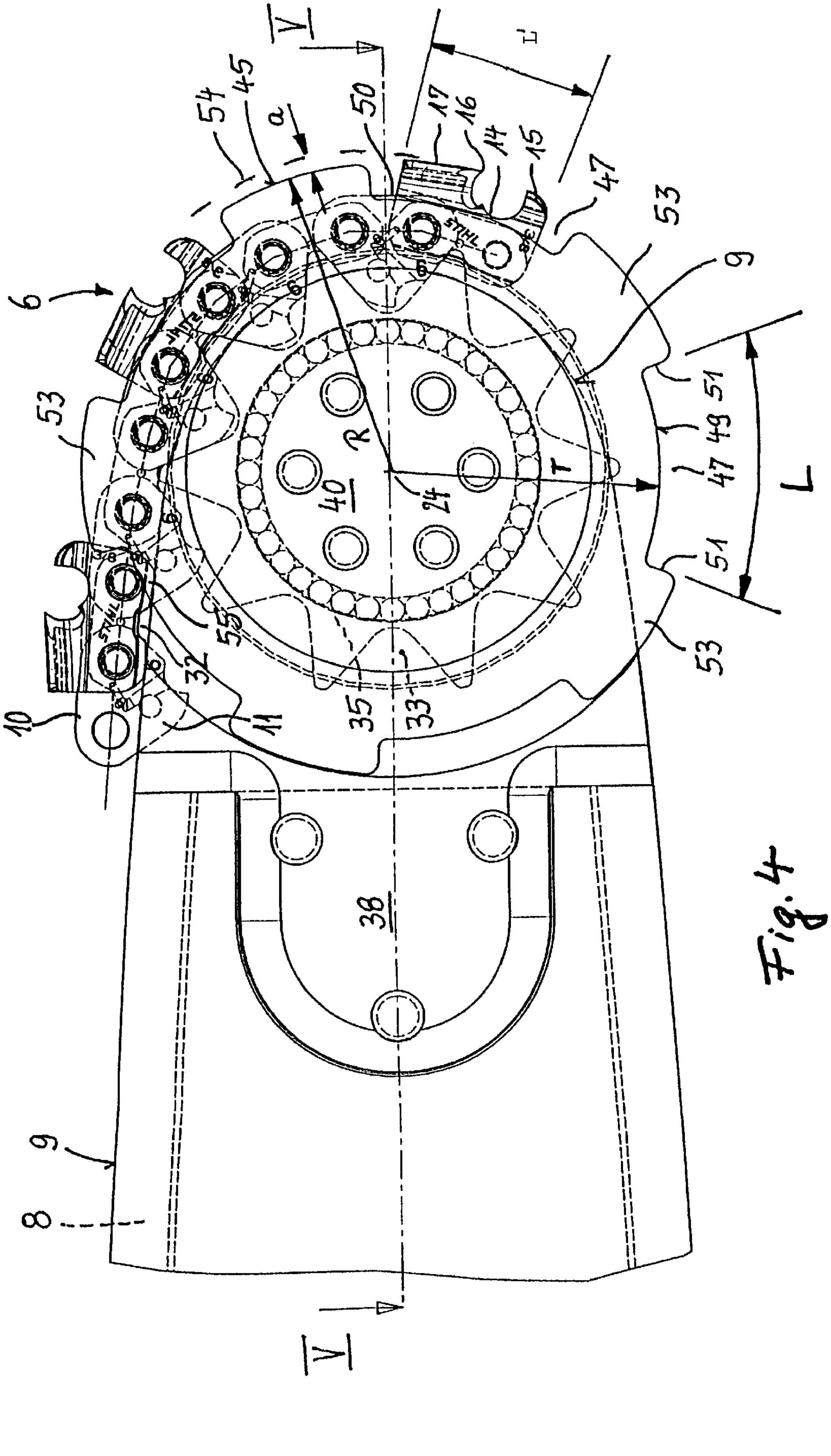
FIG. 4 is a side elevation view of the tip of the guide bar of FIG. 3.
Figure 5:
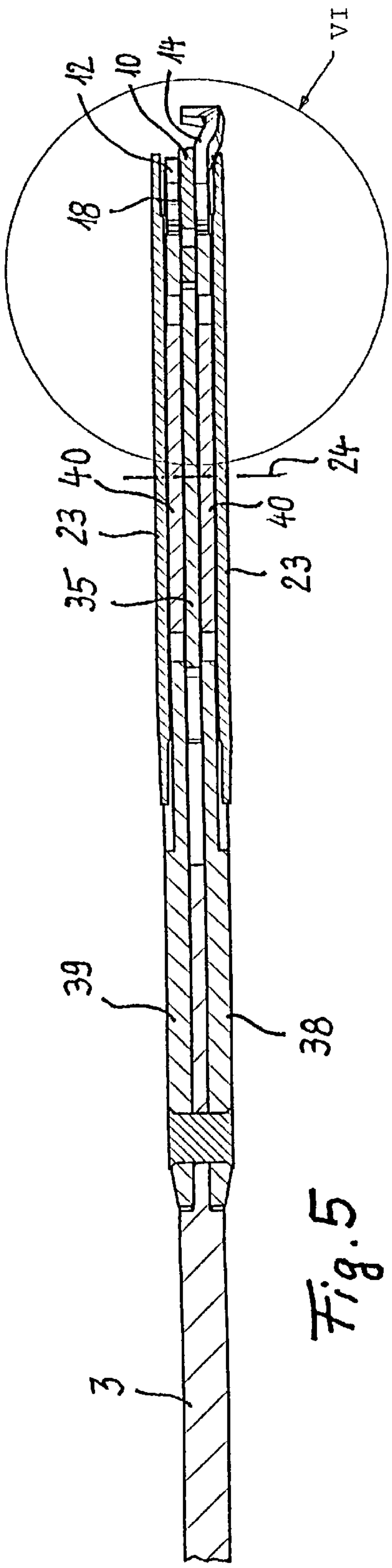
FIG. 5 is a section view taken along line V—V of FIG. 4.

As shown especially in FIGS. 2 to 4, a guide groove 8 is provided in the outer periphery of the guide bar 3. As shown in FIG. 4, rakers 11 of the center drive links 9 of the saw chain 6 engage in the guide groove 8. The saw chain 6 further comprises connecting links 12 and 14, which are configured as simple side links 12 and cutting links 14, respectively. Each cutting link 14 includes a center roof section 17 angled off to the center drive link 10. A roof cutting edge 16 is formed on the roof section 17. A depth limiter 15 is provided in front of the roof cutting edge 16 viewed in the direction of movement.

The center drive links 10 as well as the lateral connecting links 12 and 14 are pivotally connected to each other via rivets 18. The cutting links 14 are arranged so that they alternate on the right and left longitudinal sides of the saw chain. The connecting links 12 and 14 glide with their foot sections 55, which face the guide groove 8, on the guide surfaces 9 which are provided on the outer periphery of the guide bar 3 on both longitudinal sides of the guide groove 8. The tip 22 of the guide bar is provided with lateral guide members 23 as shown schematically in FIG. 1. The guide members 23 are configured as rotating guide discs 23 and especially can also be attached so as to be exchangeable. The rotational axis 24 of the disc 23 lies on the longitudinal center axis 25 of the guide bar 3. Preferably, the guide discs 23 are taken along by the saw chain 6 so that they rotate.

The motor-driven chain saw 1 is guided and held with a forward handle 26 as well as a rearward handle 27. The forward handle 26 extends over the housing 2 and the rearward handle lies aligned in the direction of the longitudinal center axis 25. A hand protective bracket 28 is assigned to the forward handle 26 to protect the operator. The hand protective bracket 28 activates a safety brake device when there is a kickback of the chain saw and its safety device brings the saw chain to standstill in fractions of a second in order to reduce the danger of injury for the operator. The saw chain 6 runs in the direction of arrow 7. A throttle lever 37 is provided in the rearward handle 27 in the grasping region of the operator's hand. A throttle lever latch 36 is assigned to the throttle lever 37.

In FIG. 2, the guide bar 3 of the invention is shown by itself. The guide bar 3 is a so-called lightweight guide bar but can also be a solid bar or a three-part bar. The invention is applicable to each type of guide bar. The attachment end 4 includes a longitudinal slot 34 lying on the longitudinal center axis 25. Stud bolts, which are fixed in the motor housing 2 extend through the slot 34 when attaching the guide bar to the housing 2.

Figure 6:
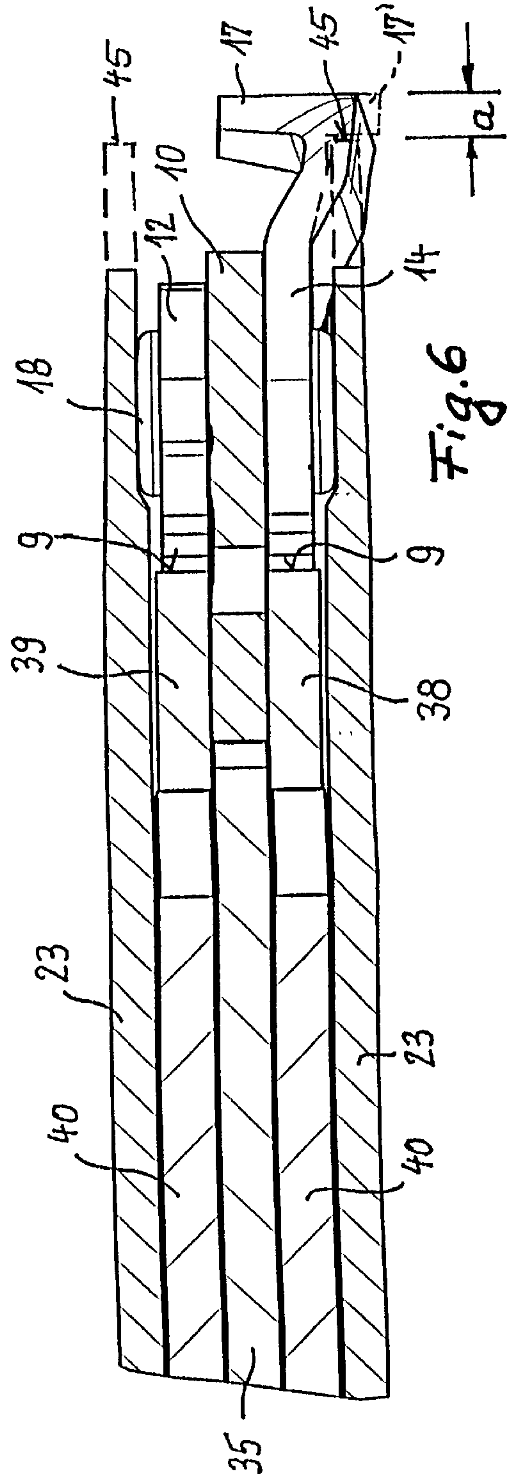
FIG. 6 is an enlarged view of the detail VI in FIG. 5.
Figure 7:
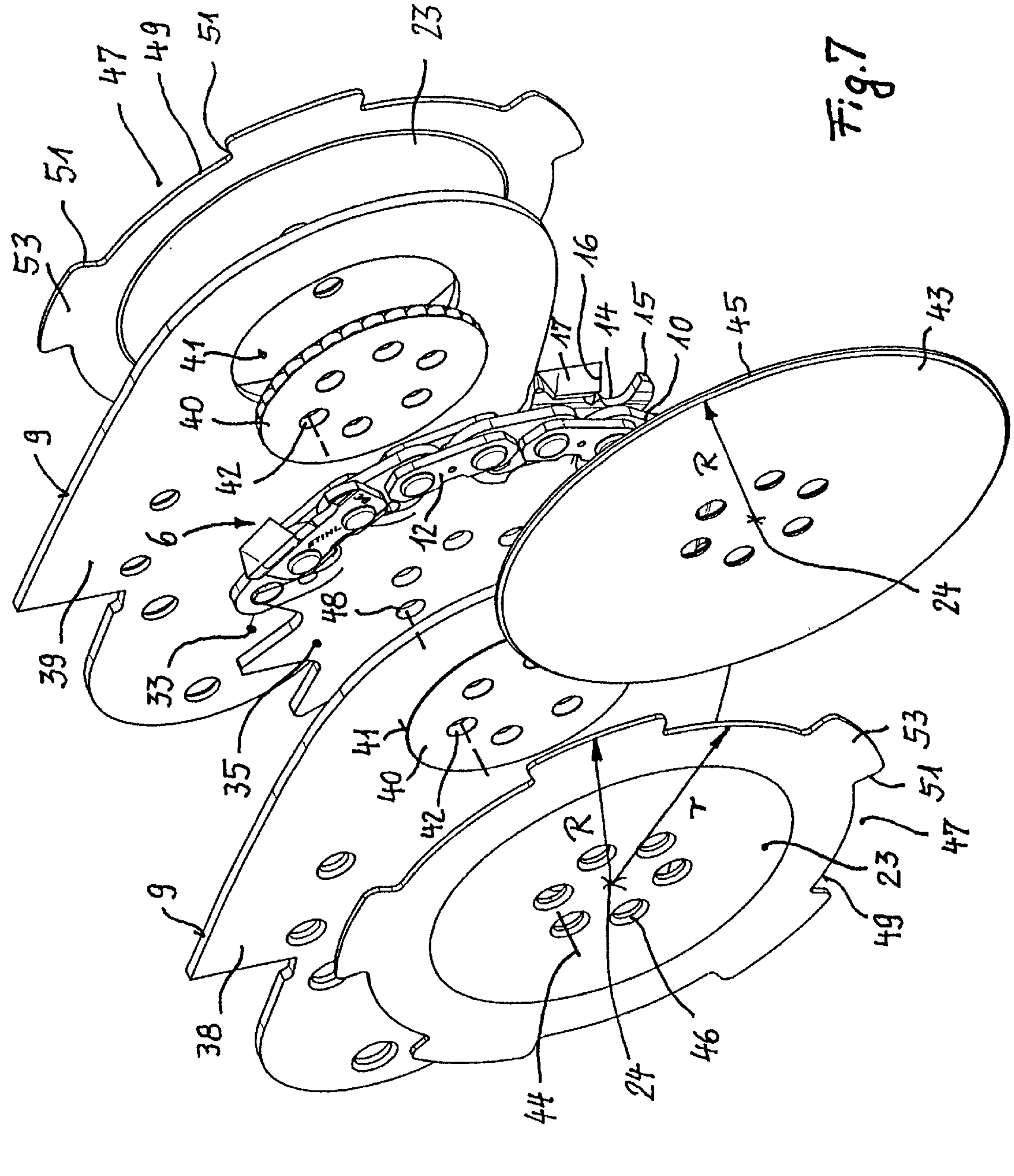
FIG. 7 is an exploded view of the configuration of the tip of the guide bar of FIG. 3.

The direction-changing section 21 of the guide bar is formed of two side plates 38 and 39 as shown in FIGS. 3 to 7. An idler sprocket 35 is mounted between these plates. The rakers 11 of the center drive links 10 engage in the gap 33 between two teeth. The outer edge of the side plates 38 and 39 define the guide surface 9 in the direction-changing region 21. The side plates 38 and 39 are attached to the base body of the guide bar 3 and have respective bearings 40 as shown in FIG. 7. The bearings 40 are held in respective bearing receptacles 41 of the side plates (38, 39).

The guide discs 23 are preferably configured to be identical and are mounted on the outer sides of the side plates 38 and 39. These outer sides face away from the idler sprocket 35. The receptacle 41 for the bearings 40 is open toward the guide discs 23. Each bearing 40 has openings 42 for receiving rivet bolts or the like. As shown in FIG. 7, a rivet bolt 44 of this kind extends through an opening 42 of the bearing 40 of the side plate 38, an opening 48 in the idler sprocket 35 as well as a next opening 42 in the bearing 40 of the side plate 39. The rivet bolt projects beyond the bearings and engages an assigned opening 46 in the guide disc 23 so that the guide discs 23 are connected to the idler sprocket 35 so as to rotate therewith. The idler sprocket 35 receives the raker 11 of a drive link 10 in each gap 33 in correspondence to its tooth pitch and the guide discs 23 are connected in a predetermined position to the idler sprocket 35. For this reason, the position of the guide discs 23 referred to the spacing of the saw chain 6 is constructively predetermined. A relative movement between the saw chain 6 and the guide discs 23 is reliably avoided.

The maximum radius R of the guide discs 23 is so selected that the edge 45 ends at only a small spacing (a) radially below the circular trace 54 of the roof cutting edge 16 (see FIG. 4). In the region of a cutting link 14, a cutout 47 is provided on the disc periphery which exposes the cutting tooth. The base edge 49 of the cutout 47 has a radius (r) at approximately the elevation of the upper edge 50 of the drive link 10 or at the lateral cropping of the cutting link 14. The upper edge 50 faces toward the cutting roof 16 of the cutting link 14. The position of the base edge 49 of the cutout 47 to the side of the saw chain 6 is shown especially in FIGS. 5 and 6. The guide discs 23 lie on the outer side of the guide plates 38 and 39 and project radially beyond the guide surfaces 9. The guide discs laterally cover the saw chain 6.

Referring to FIGS. 3 and 4, each cutout 47 extends in the peripheral direction over a length L which is preferably slightly greater than the length L' of the cutting link 14.

Figure 8:
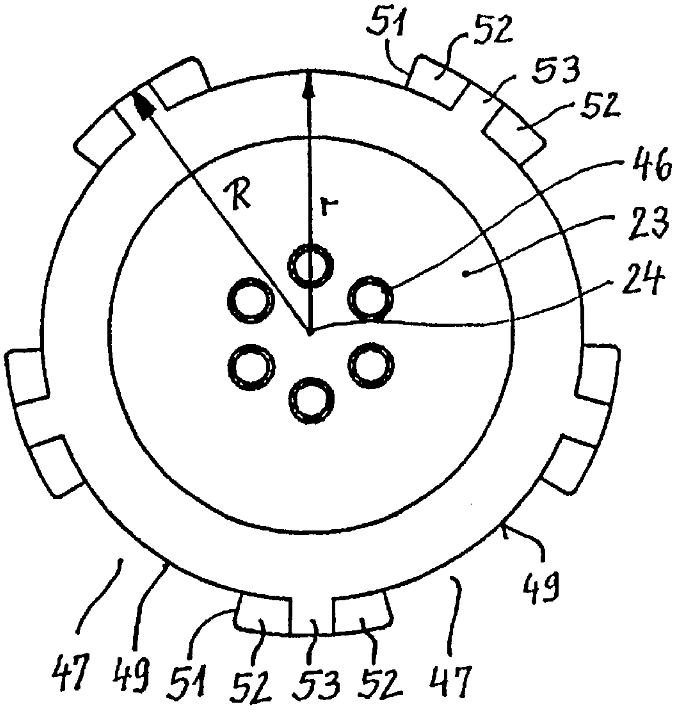
FIG. 8 is a side elevation view of a guide disc having cutting teeth formed on the outer periphery thereof.
Figure 9:
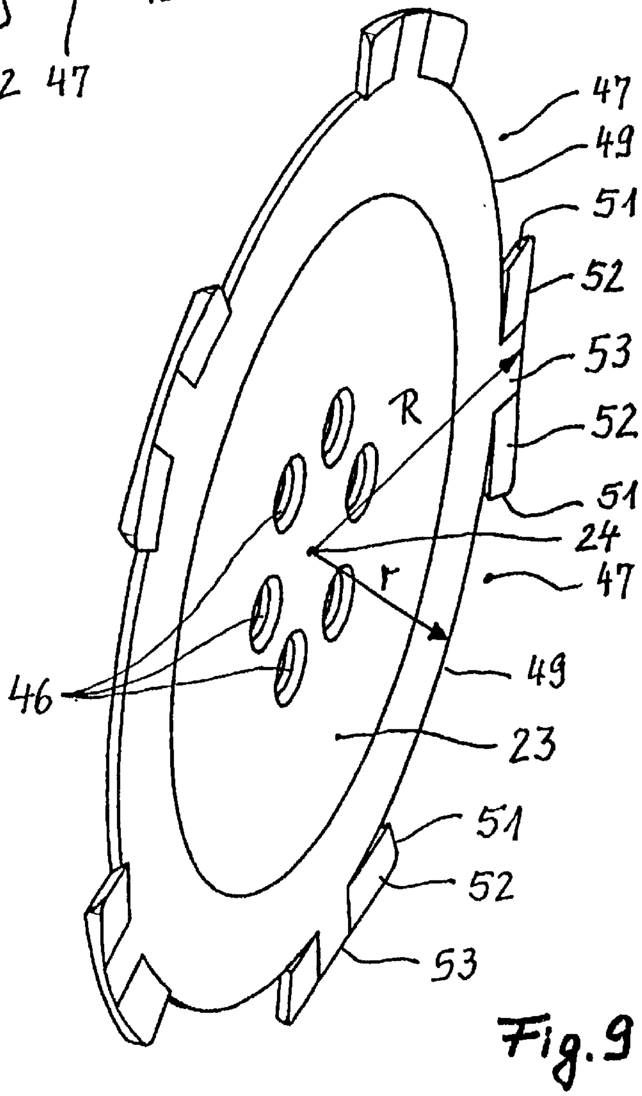
FIG. 9 is a perspective view of the guide disc of FIG. 8.

It can be advantageous to configure the radial edges 51 of each cutout 47 as a cutting tooth as shown in FIGS. 8 and 9. Preferably, both edges 51 are configured as cutting teeth 52 whereby the guide discs, which are arranged to the right and left at the tip 22 of the guide bar, can be configured identically. The cutting teeth 52 of the guide discs 23 favorably influence the chipping power of the saw chain during plunge cutting work.

If a guide bar, which is configured in accordance with the invention, is plunged with the tip into wood as is, for example, necessary for tree maintenance, then the radial sections 53 project into the space between two successive cutting teeth 14 whereby too deep a penetration of the tip 22 of the guide bar into the work piece is reliably prevented. A radial section 53 is provided between each two cutouts 47. It was determined that even under unfavorable work conditions, a possible kickback of the chain saw is reduced to a minimum.

It can be advantageous to configure the drive discs as a full disc without cutouts 47 on the disc edge 45 as shown for the guide disc 43 in FIG. 7. If the radius R is adjusted to be slightly less than the trace line 54 (FIG. 1), then the disc edge 45 ends below the cutting edge 16 of the cutting tooth 14 by a spacing (a). This is shown in phantom outline in FIG. 6. Here, the cutting tooth 14 can be adapted with respect to its configuration so that the cutting edge 45 can be pulled up to the elevation of the roof section 17 having the cutting edge 16 without affecting the cutting width. It is practical that the cutting tooth 14 with its part 17' of its roof section 17 projects beyond the edge 45 of the guide disc 23 so that the cutting tooth 14 has a configuration of an approximate T-shape as shown in FIG. 6. The part 17' of the roof section 17, on which the roof cutting edge 16 is formed, projects beyond the disc edge 45. For this reason, the use of the cutting teeth 14 is not affected by pulling up the disc edge 45 up to approximately the trace line 54. The slight distance (a) of the disc edge 45 to the cutting edge of the roof section 17 of the cutting tooth 14 ensures that the chain saw exhibits only a low tendency for kickback. If the guide disc 43 is configured without a cutout, that is, as a full disc, a friction-tight rotational entrainment or take along by the saw chain can be adequate because relative movements between the saw chain 6 and the guide discs 43 are permitted.

Figure 10:
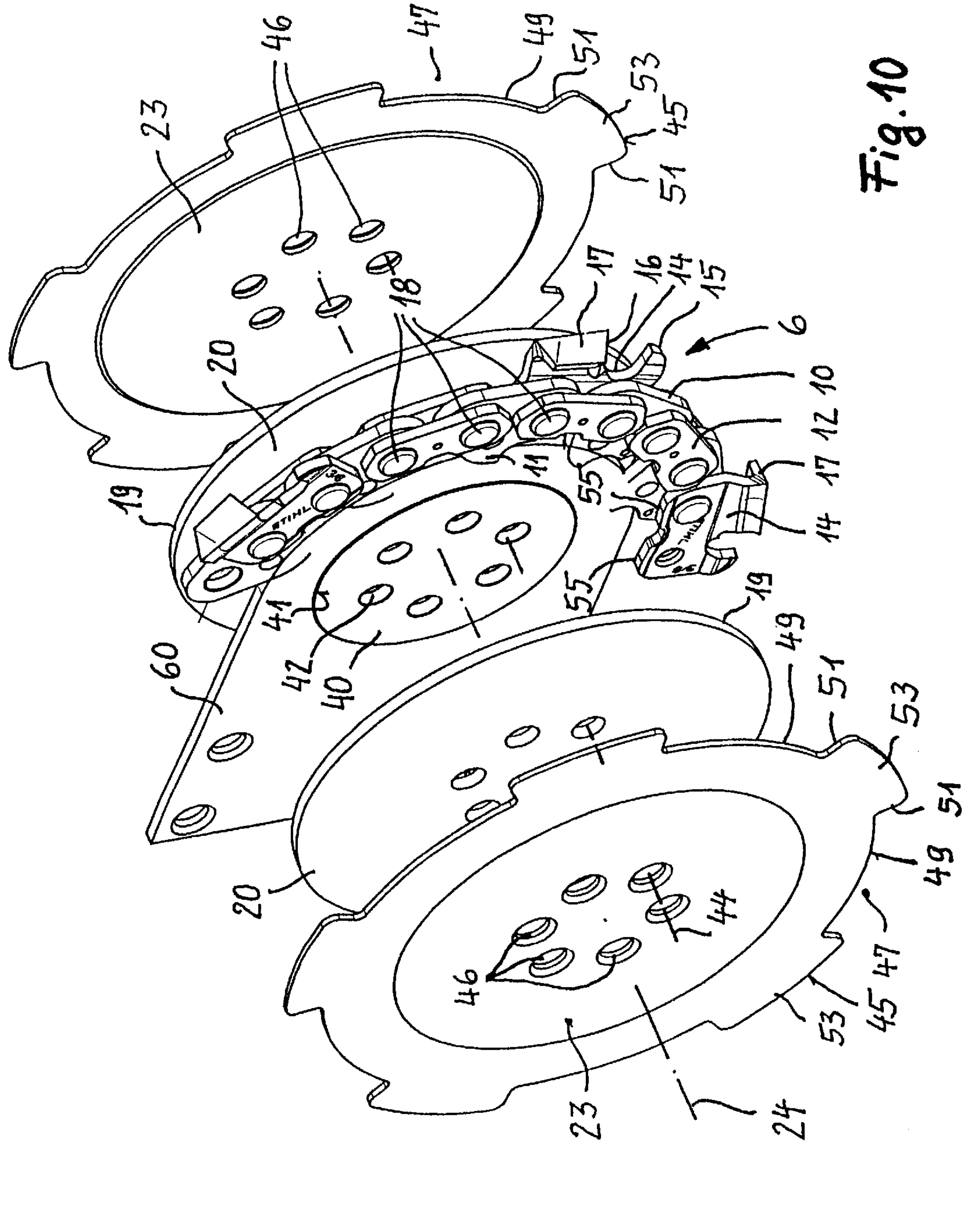
FIG. 10 is an exploded view of an additional embodiment of the tip of the guide bar; and, FIG. 11 is an exploded view of another embodiment of the tip of the guide bar.
Figure 11:
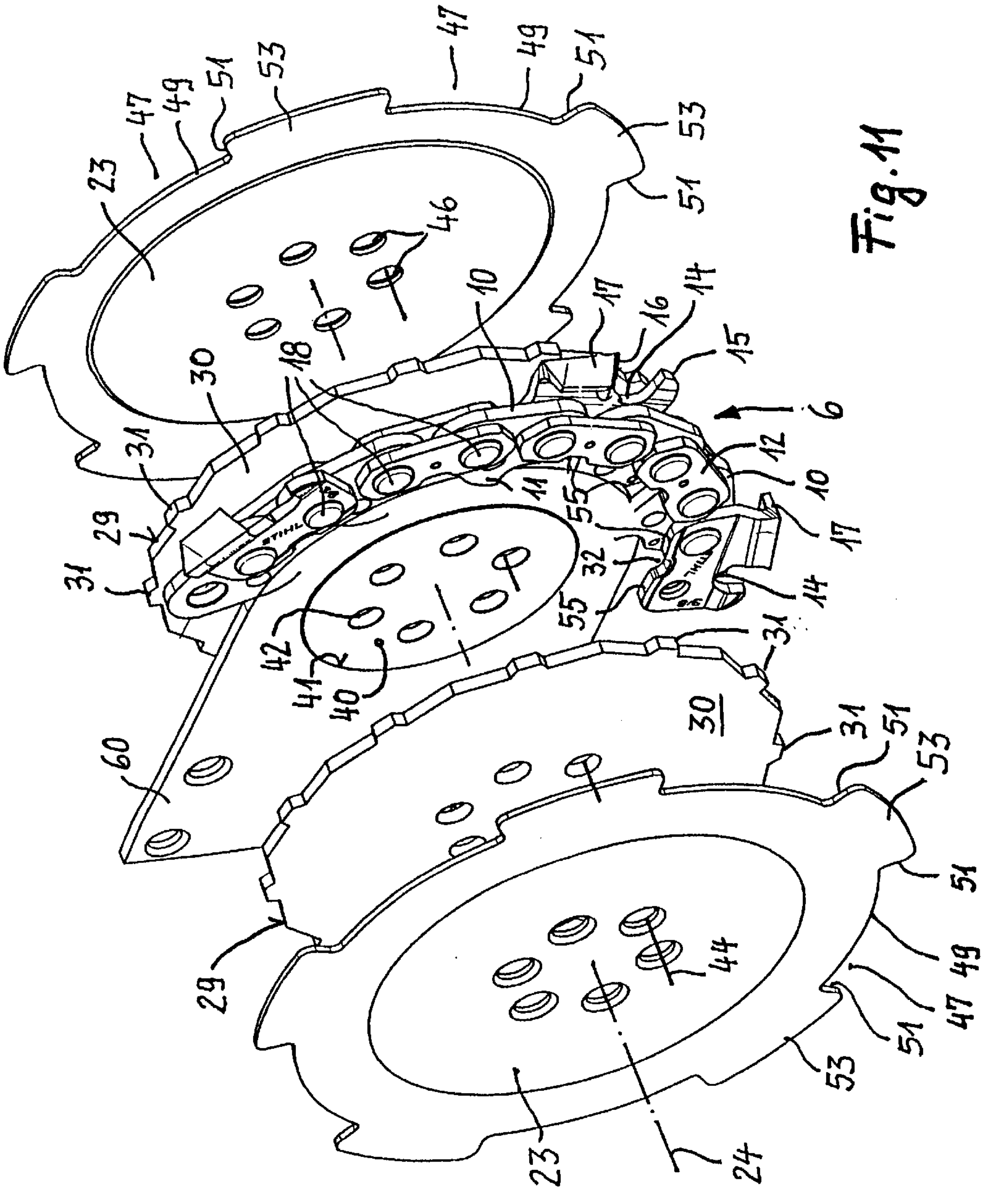

Whereas in the embodiment of FIGS. 3 to 7, the direction-changing section 21 is configured by two side plates (38, 39) having an idler sprocket 35 mounted therebetween, the embodiments of FIGS. 10 and 11 of the direction-changing section 21 are formed essentially by a center plate 60 which is fixed to the base body of the guide bar 3. In FIG. 10, the center plate 60 includes a bearing 40 in a receptacle 41 and this bearing has a plurality of openings 42 for rivets, rivet bolts or the like as explained above. Guide discs 20 are attached to both longitudinal sides of the center plate 60, that is, the guide discs 20 are mounted to the bearing 40 so as to rotate therewith. The outer periphery of the guide discs 20 defines the guide surfaces 19 corresponding to the guide surfaces 9.

The lateral connecting links 12 and 14 of the saw chain 6 glide on the guide surfaces 19 and, for this purpose, the lateral connecting links 12 and 14 (side links 12, cutting links 14) have foot surfaces 55. The outer guide discs 23 are mounted together with the guide discs 20 on the center plate 60. The parts 20 and 23 can be configured as one piece. After assembly, the bearing 42, the two lateral guide discs 20 and the outer guide discs 23 conjointly define a common component in this embodiment wherein all parts are fixed so that they rotate together. The bearing 42 lies in the center plate 60.

In the embodiment of FIG. 10, the entrainment of the guide discs 23 takes place via the friction lock between the foot surfaces 55 of the lateral chain links 12 and 14 as well as the peripheral edge of the guide disc 20 as guiding surface 19. With a friction-tight entrainment of this kind, a configuration of the guide disc as full disc 43 as shown in FIG. 7 is practical. The cutting tooth 17' preferably has a T-shaped configuration corresponding to the phantom outline shown in FIG. 6.

The embodiment of FIG. 11 corresponds in its basic configuration to that of FIG. 10. In the embodiment of FIG. 11, ancillary discs 30 are provided which are configured on the disc edge 45 to be similar to a tooth configuration with individual teeth 31. As shown in FIG. 11, each lateral connecting link (12, 14) has a cutout 32 between rivets 18 in the foot region. This cutout 32 partitions the foot region into two foot surfaces 55 lying one behind the other in the running direction. The tooth 31 engages in the cutout 32 of the lateral connecting links (12, 14) whereby a form-tight entrainment of the ancillary discs 30 and the guide discs 23 is ensured. The guide discs 23 are connected to the discs 30 so that they rotate one with the other, that is, there is no relative rotation between the discs 23 and 30. A relative displacement between the saw chain 6 and the guide discs 23 is thereby reliably precluded. Even after several hours of operation, the cutting links 14 always lie in the cutout 47 provided therefor between the two radial sections 53 which counter the dangerous kickback tendency during plunge cutting operations.

It is understood that the foregoing description is that of the preferred embodiments of the invention and that various changes and modifications may be made thereto without departing from the spirit and scope of the invention as defined in the appended claims.

What is claimed is:

1. A guide bar for a saw chain of a motor-driven chain saw having a housing, the saw chain including cutting links, lateral connecting links and center drive links pivotally connected to each other via rivets with the drive links having respective rakers formed thereon and each two successive ones of said cutting links defining a space therebetween, the guide bar comprising:

an elongated planar base body defining an outer periphery wherein a peripheral guide groove is provided for receiving said rakers therein and for guiding said saw chain along said outer periphery;

said guide bar having guiding surfaces along said outer periphery for supporting said lateral connecting links and said cutting links and said guiding surfaces being separated from each other by said guide groove;

said guide bar having an attachment end at one end thereof for attaching said guide bar to the housing of said chain saw and direction-changing section at the other end thereof for guiding said saw chain over the outer free end of said guide bar;

guide plates mounted on said base body in said direction-changing section and extending radially beyond said guiding surfaces to laterally cover said connecting links and laterally guide said saw chain;

said guide plates being configured as rotating guide discs; and, each of said guide discs having a plurality of cutouts formed in the peripheral edge thereof to define a radial section between each two mutually adjacent ones of said cutouts with corresponding ones of the radial sections extending into the space between two successive ones of said cutting links.

2. The guide bar of claim 1, further comprising means for rotatingly mounting said guide discs so as to be entrained and rotatably driven by said saw chain.

3. The guide bar of claim 2, wherein, a movement of said guide discs with said saw chain is ensured via at least one of a force-tight engagement and a friction-tight engagement of said saw chain and said guide discs.

4. The guide bar of claim 1, further comprising an idler sprocket rotatably mounted in said direction-changing section; and, said guide discs being connected to said idler sprocket so as to rotate therewith.

5. The guide bar of claim 1, wherein said direction-changing section includes two side plates mounted on said guide bar; two bearings mounted in said side plates, respectively, and said bearings are connected to respective ones of said guide discs.

6. The guide bar of claim 1, wherein each of said cutting links has a roof cutting edge; and, each of said guide discs has peripheral edge segments defined by said radial sections, respectively, which end at a small distance (a) radially below the roof cutting edges of the cutting links.

7. The guide bar of claim 6, wherein at least one of said cutting links has a cutting tooth having a cutting section extending beyond said peripheral edge segments.

8. The guide bar of claim 6, wherein each of said cutting links has a lateral offset to support a roof defining said roof cutting edge; each of said cutouts has a length (L) viewed in the peripheral direction of said peripheral edge segments; said length (L) is configured longer than the cutting link; and, each of said cutouts has a base edge which lies at the elevation of the lateral offset of the cutting link.

9. The guide bar of claim 1, wherein each of said cutouts has radial edges configured as cutting teeth.

10. The guide bar of claim 1, further comprising ancillary discs having guiding surfaces, respectively, for said cutting links and said lateral connecting links; and, said ancillary discs being rotatably mounted in said direction-changing section.

11. The guide bar of claim 10, further comprising a central plate disposed in said direction-changing section and connected to said base body; a bearing mounted in said central plate; said ancillary discs and said guide discs being connected to each other so that they rotate together without slippage therebetween; and, said ancillary discs and said guide discs being held by said bearing common thereto on said central plate.

12. The guide bar of claim 11, wherein said lateral connecting links and said cutting links have cutouts formed therein; and, said ancillary discs have projections for engaging in said cutouts of said links.

* * * * *